United States Patent [19]

Matsuura et al.

[11] Patent Number: 4,476,627
[45] Date of Patent: Oct. 16, 1984

[54] AUTOMATIC ASSEMBLING MACHINE

[75] Inventors: Tamiaki Matsuura; Takeshi Aiba; Takashi Fukushima; Masanori Nishimura; Hiroshi Ohtsuki, all of Kanagawa; Fujio Yabuki, Saitama; Tomio Kusakabe, Chiba, all of Japan

[73] Assignee: Sony Corporation, Tokyo, Japan

[21] Appl. No.: 391,472

[22] Filed: Jun. 23, 1982

[30] Foreign Application Priority Data

Jun. 24, 1981 [JP] Japan .............................. 56-93507[U]
Jun. 27, 1981 [JP] Japan .............................. 56-95936[U]

[51] Int. Cl.³ ........................ B23P 19/00; B23P 21/00
[52] U.S. Cl. ......................................... 29/791; 29/703
[58] Field of Search ...................... 29/568, 791, 564.0, 29/564.1, 33 K, 701, 702, 703, 784; 364/474

[56] References Cited

U.S. PATENT DOCUMENTS

| 3,641,651 | 2/1972 | Rockwell et al. | 29/709 |
| 3,973,863 | 8/1976 | Smith | 29/568 |
| 4,293,998 | 10/1981 | Kawa et al. | 29/741 |

FOREIGN PATENT DOCUMENTS 2034613 6/1980 United Kingdom .
1589543 5/1981 United Kingdom .
2091138 7/1982 United Kingdom .

OTHER PUBLICATIONS

Experimental System for Computer Controlled Mechnical Assembly *IEEE Transactions on Computers,* vol. C24 No. 9, pp. 879–888, Sep. 1975, Will and Grossman.

*Primary Examiner*—Howard N. Goldberg
*Assistant Examiner*—Steven E. Nichols
*Attorney, Agent, or Firm*—Lewis H. Eslinger; Alvin Sinderbrand

[57] ABSTRACT

A machine for automatically assembling equipment composed of parts at least some of which are arranged on a carrier includes a movable table which supports the carrier and which moves in two orthogonal directions in a horizontal plane. A tray is supported on the table and has additional parts or tools arranged thereon for use during assembly. A mounting surface extends above the plane of the movable table and has first and second portions parallel to the two orthogonal directions. At least one working unit is attached to at least one of the portions of the mounting surface for selective engagement with the parts and the tools on the tray upon movements of the movable table in assembling the equipment.

11 Claims, 32 Drawing Figures

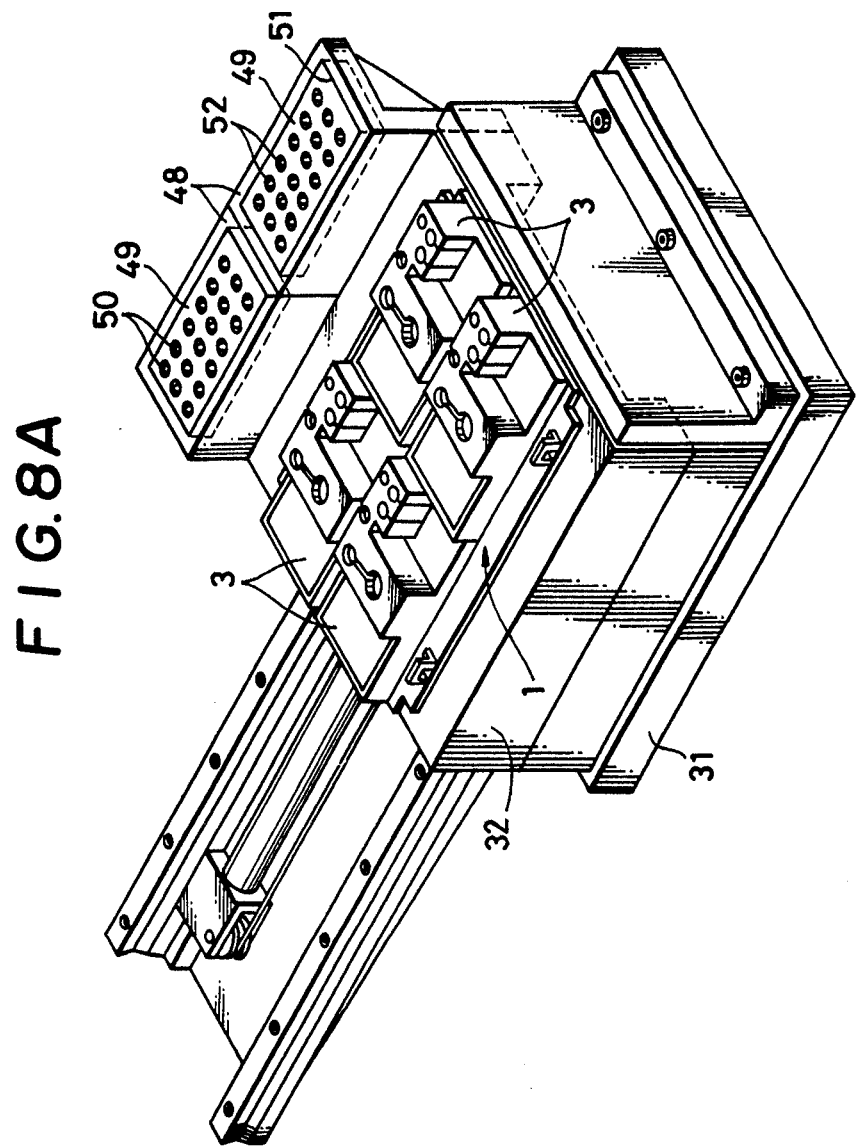

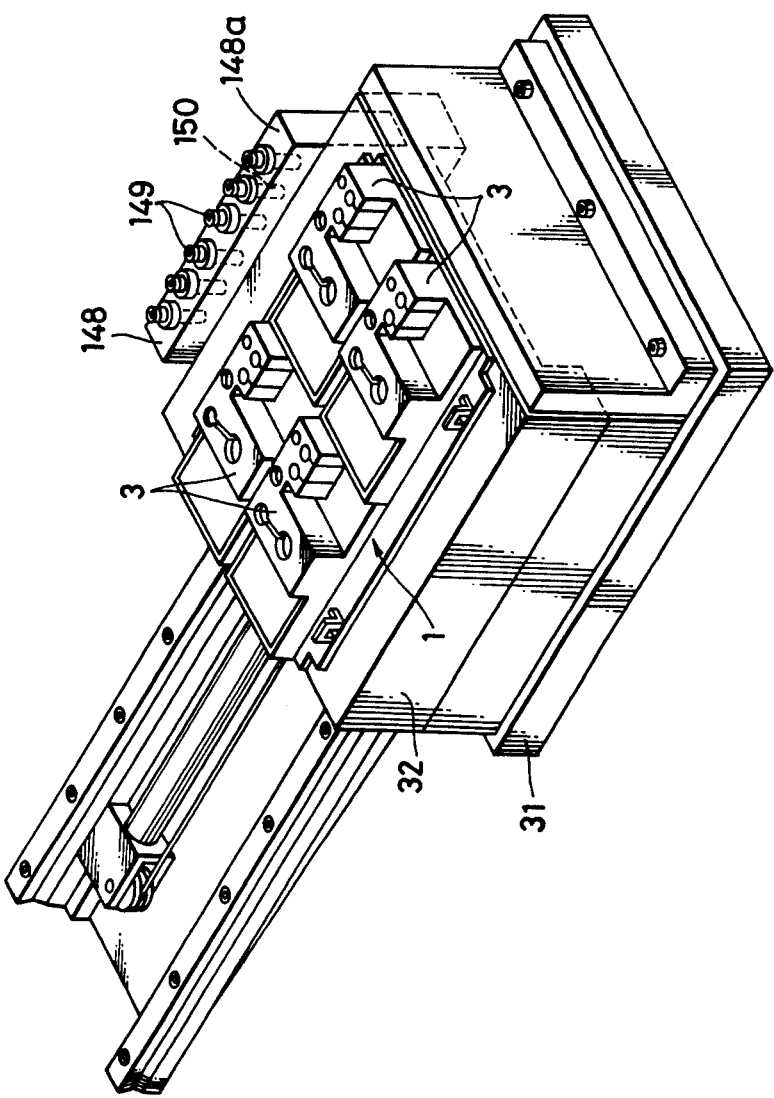

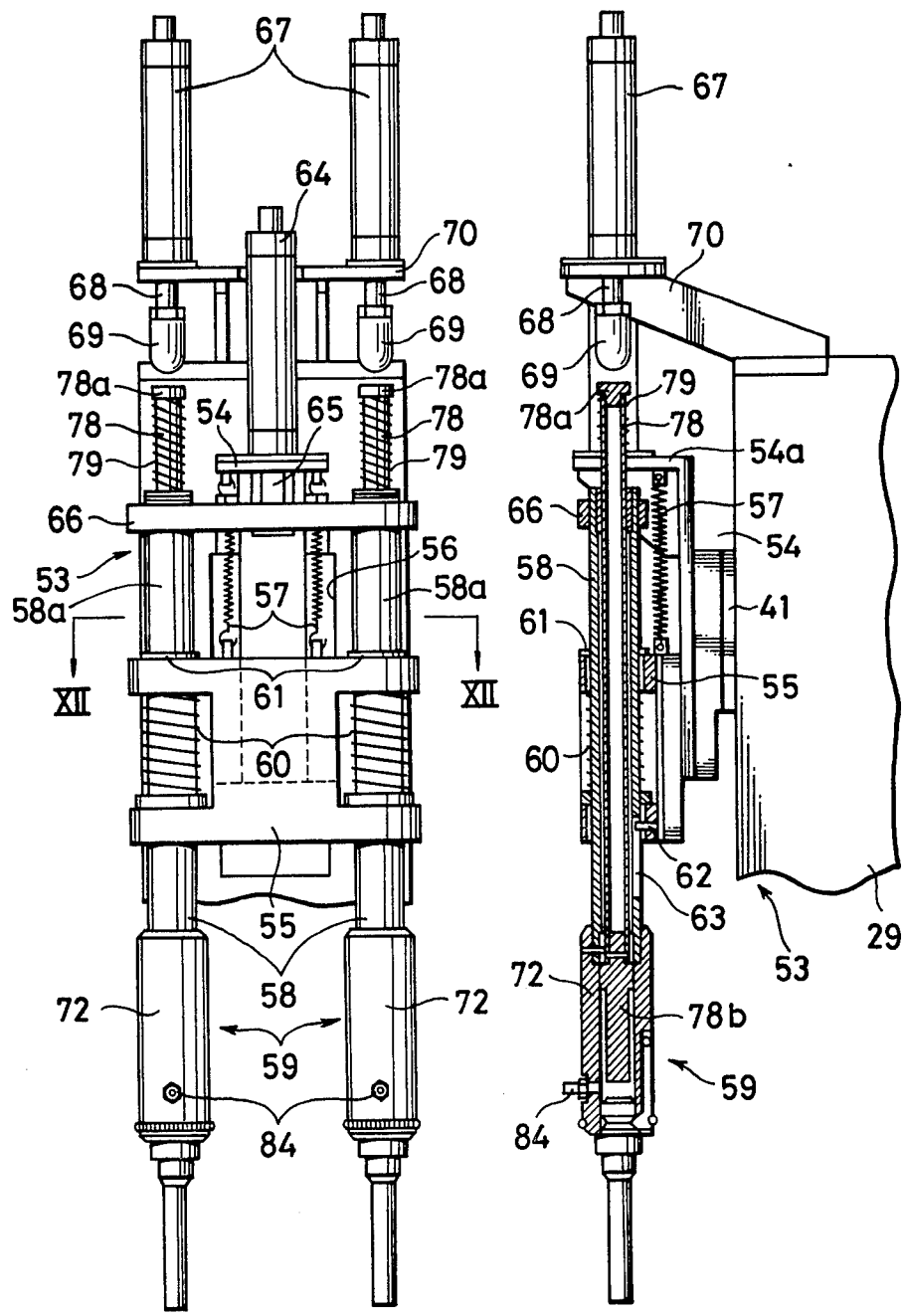

AUTOMATIC ASSEMBLING MACHINE

CROSS REFERENCES TO RELATED APPLICATIONS

Reference is made to copending applications Ser. Nos. 06/380,997, 06/387,414, and 06/390,061, assigned to the assignee of the present application, and containing related subject matter.

BACKGROUND OF THE INVENTION

1. Field of the Invention

This invention relates to automatic assembling machines, and more particularly, to an automatic assembling machine in which parts for assembly on a carrier member or tools used during assembly are arranged on a tray adjacent the carrier member.

2. Description of the Prior Art

An automatic assembling machine conventionally assembles parts onto a chassis supported by a carrier. Generally, one unit supplies the parts and another unit, distinct from the parts supplier, supplies the chassis to a carrier. The automatic assembling machine sequentially picks up the parts from the parts supplier and assembles them on the chassis transported by the carrier.

However, with such devices, the shape and configuration of the parts supplier and related equipment are complex and thus, costly. Also, only a limited number of parts can be supplied by the parts supplier, and the supply and assembly operations are not highly reliable.

Conventional automatic assembling machines are not easily adapted to accommodate changes in the types of equipment to be assembled. The parts supplier or the main body of the associated units must undergo significant modifications when there is a change in the type of equipment to be assembled.

In conventional automatic assembling units, a special tool exchange unit such as a turret or an indexing mechanism is used to change the tools. The special tool exchange unit is controlled separately from a movable table which moves the carrier member. The automatic tool exchange unit must also be separately controlled from the movable table, thus creating complex and expensive control circuits. A large amount of time is also required to exchange tools since a tool change unit separate from the assembly unit is employed.

OBJECTS AND SUMMARY OF THE INVENTION

It is an object of the present invention to provide an automatic assembling machine which can easily accommodate changes in the type of equipment to be assembled.

It is a further object of the present invention to provide an automatic assembling machine which can automatically change tools used therein efficiently and quickly.

According to the present invention, a machine is disclosed for automatically assembling equipment composed of parts at least some of which are arranged on a carrier. A movable table supports the carrier and moves in two orthogonal directions in a horizontal plane. A tray is supported on the table and has parts or tools arranged thereon for use during assembly. A mounting surface extends above the plane of the movable table. At least one working unit is attached to the mounting surface and selectively engages the parts and the tools arranged on the tray with movements of the table in assembly.

The above and many other objects, features and advantages of this invention will become apparent from the following detailed description, which is to be read in connection with the accompanying drawings.

BRIEF DESCRIPTION OF THE DRAWINGS

FIG. 8A is a perspective view showing a carrier and a parts supplying tray positioned on the movable table in accordance with an embodiment of this invention;

FIG. 8B is a perspective view of a carrier and a tool holding tray positioned on the movable table in accordance with another embodiment of this invention;

FIG. 11B is a front view of the automatic tool exchange head of FIG. 11A;

FIG. 11C is a side elevational view, partly in longitudinal section, of the automatic tool exchange head of FIG. 11A;

DETAILED DESCRIPTION OF PREFERRED EMBODIMENTS

Figure 1:
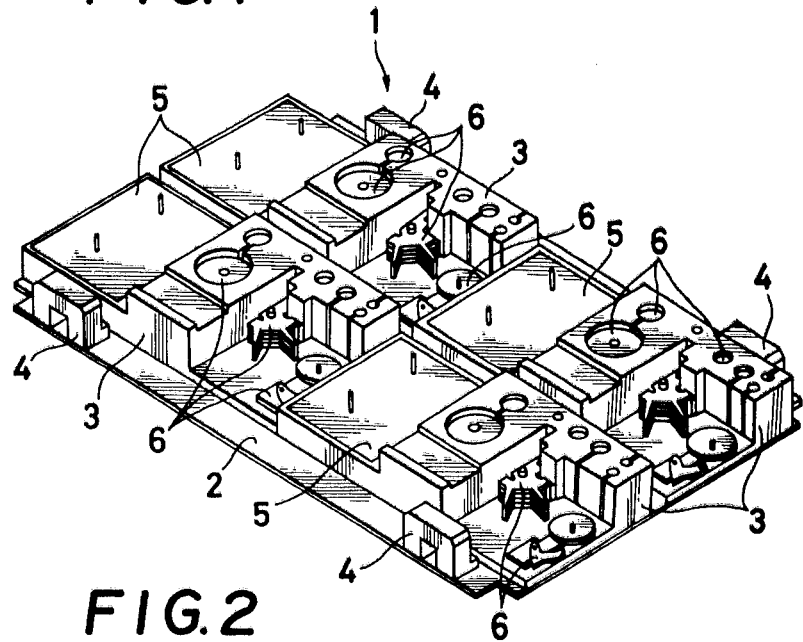
FIG. 1 is a perspective view of a carrier member for use with an automatic assembling apparatus according to the present invention.

Referring to the drawings in detail, and initially to FIG. 1 thereof, a carrier 1 for use in an automatic assembling apparatus according to an embodiment of this invention is shown to include a base plate 2 with four pallets 3 arranged thereon and fixed in alignment with each other. Suspension handles or keepers 4 are respectively mounted to the four corners of the base plate 2.

Each of the pallets 3 of the carrier 1 has positioned thereon before the assembling operation a chassis 5 and main parts 6 which may be various types of gears, levers, bearings and the like required for assembly on the chassis 5. When the carrier 1 is loaded with the chassis 5 and the main parts 6, it is transferred to an assembly center to be described where an automatic assembling machine sequentially picks-up, feeds, and assembles the main parts 6 onto the chassis 5. At the assembly center, common parts and some other parts, such as reel shafts, screws, and the like are separately fed and assembled onto the chassis 5. In addition to the feeding and assembly of the parts on the chassis 5, other operations such as tightening of the screws, lubrication of parts, magnetization of magnetic members, and other associated operations can be automatically performed at the assembly center. The feeding, processing and assembling of the parts on the chassis 5 are simultaneously performed for the four pallets 3 of the carrier.

Figure 2:
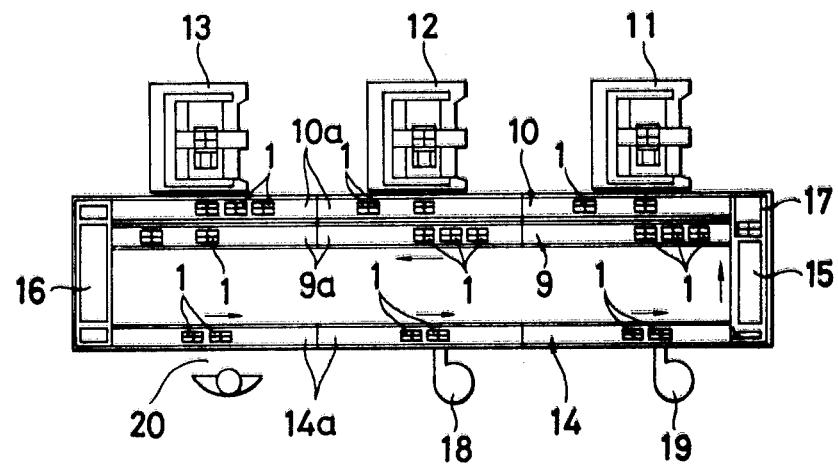
FIG. 2 is a plan view of an automatic assembling apparatus with which carrier members are particularly usable.

An arrangement of conveyers for transporting carriers 1 to and from a number of assembly stations in an automatic assembling apparatus making use of this invention will now be described. In particular, a pair of parallel and adjacent conveyers 9 and 10 are provided to transfer the carriers 1 in the direction of the arrow adjacent to conveyer 9 in FIG. 2. A plurality of assembly centers or stations, for example, three assembly stations 11, 12 and 13 in FIG. 2, are arranged outside of the conveying system adjacent conveyer 10 for performing the feeding, processing and assembling operations with respect to the carriers 1 which are transported by conveyers 9 and 10 to and from the various assembly stations 11, 12 and 13.

In addition, another conveyer 14 is spaced from and parallel to conveyer 9, and a pair of conveyers 15, 16 are provided for connecting the respective ends of the conveyer 14 to the corresponding ends of conveyers 15, 16. In this regard, conveyers 9, 10, 14, 15 and 16 define an endless conveyer line, with carriers 1 being transferred by the end-less conveyer line in the direction indicated by the arrows in FIG. 2. The conveyers may be formed by any suitable conveyer system, for example, the conveyers may be comprised of roller conveyers, that is, each conveyer being comprised of a plurality of rotatable rollers over which carriers 1 travel. In this regard, carriers 1 can be stopped at any position along the conveyers by means of appropriate stopping members interposed in their path and can immediately resume their travel upon release of the stopping members. Conveyers 9, 10 and 14 are each divided into a plurality of short conveying sections, 9a 10a and 14a respectively, each conveying section corresponding to a respective one of the assembly stations. In this manner, independent feeding and discharging of carriers 1 with respect to assembly stations 11, 12 and 13 can be easily accomplished.

A distributor 17 is arranged at the front end of the conveyer 15, that is, the end adjacent conveyers 9 and 10, for selectively feeding carriers 1 to either conveyer 9 or conveyer 10, as will be apparent hereinafter. In addition, loading stations 18, 19 are arranged at, for example, two downstream positions of conveyer 14 for supplying carriers 1 to the conveying system, and an unloading station 20 is arranged at the upstream position of conveyer 14 for removing from the conveying system those carriers on which the chassis 5 and respective parts 6 have been assembled together. In this manner, four chassis 5 and associated parts 6 to be assembled thereon are placed on each carrier 1, and the latter are then supplied to the respective loading stations 18, 19 where they are transferred to the conveyer 14. The conveyer 14 then moves the carrier 1 to the conveyer 15, where the distributor 17 selectively feeds the carriers 1 to either the conveyer 9 or the conveyer 10 according to a preset distribution arrangement. The carriers 1 can then be transferred or fed to a first assembly station 11 by the respective conveyer 9 or 10. In particular, the carriers 1 from the conveyer 9 and the conveyer 10 are transferred to the assembly station 11 by a carrier loader thereat and placed on a movable table of assembly station 11, where feeding, processing and assembling operations of the parts 6 on the chassis 5 are automatically performed, as hereinafter further described. Upon completion of the above operations, the carriers 1 are discharged onto one of the conveyers 9, 10 by the carrier loader to be transferred to the next assembly station 12. It is to be appreciated that the carrier loader is movable between a first position in opposing relation to the movable table of assembly station 11 and a second position in opposing relation to the conveyers 9, 10. Feeding and discharge of the carriers 1 with respect to the assembly stations 12, 13 at downstream positions of conveyers 9, 10 are performed in a similar manner. Upon completion of the above operations with respect to the assembly station 13, the carriers are transferred to unloading station 20 by the conveyers 16 and 14 and there unloaded from the conveyer 14, for example, by an operator. The various steps of the operation may be easily varied by switching the feeding and discharge lines of the carriers 1 at the assembly stations 11, 12 and 13 by means of the conveyers 9 and 10.

Figure 3:
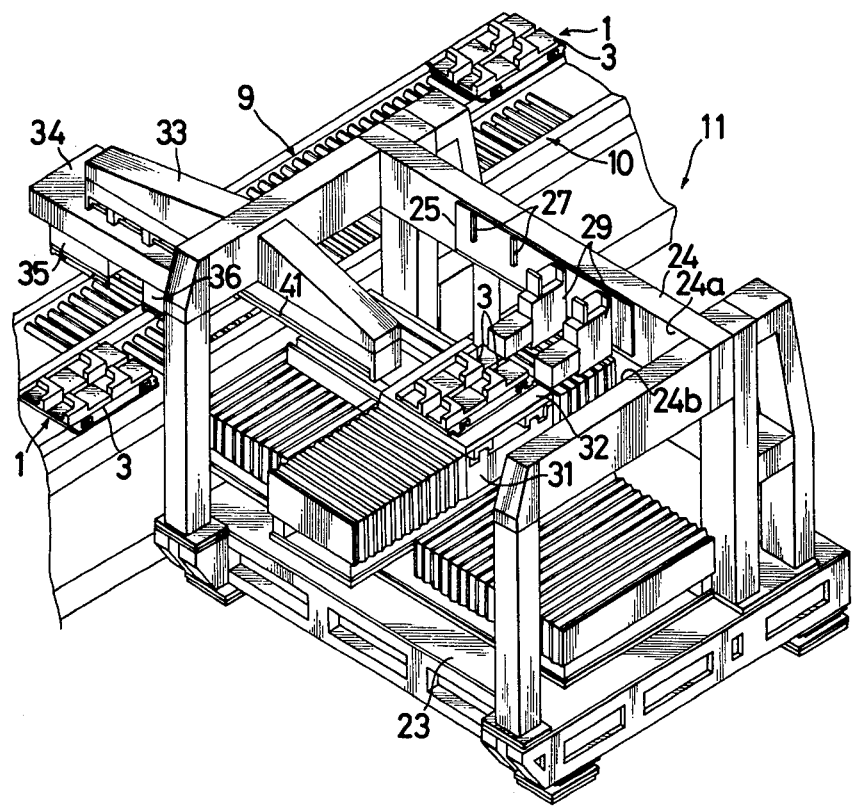
FIG. 3 is a perspective view of an assembly center or station.

The construction of the assembly station 11 will now be described with reference to FIGS. 3, 4 and 5. It is to be appreciated, however, that the assembly stations 12 and 13 may also be of the same construction. In particular, the assembly station 11 includes a horizontal, substantially U-shaped mounting member 24 supported by vertical members above a horizontal base 23 and parallel to the latter. The inner side surfaces 24a, 24b of the connecting segment, and a leg, respectively, of U-shaped mounting member 24 have mounting plates 25, and 26, respectively, secured thereto, mounting plates 25 and 26 therefore being perpendicular to each other. A plurality of keys 27 are vertically mounted on the mounting plate 25 and are spaced from each other at predetermined intervals in the direction of the X-axis, that is, the horizontal direction along surface 24a. In a like manner, a plurality of keys 28 are vertically mounted on the mounting plate 26 and are spaced from each other at predetermined intervals in a Y-axis horizontal direction. Working units 29 and 30 are mounted on selected ones of the keys 27 and 28, respectively, and can be easily removed from one key and mounted on another key. The working units include working heads mounted on the lower ends of the working units 29 and 30 which are vertically reciprocable.

Figure 4:
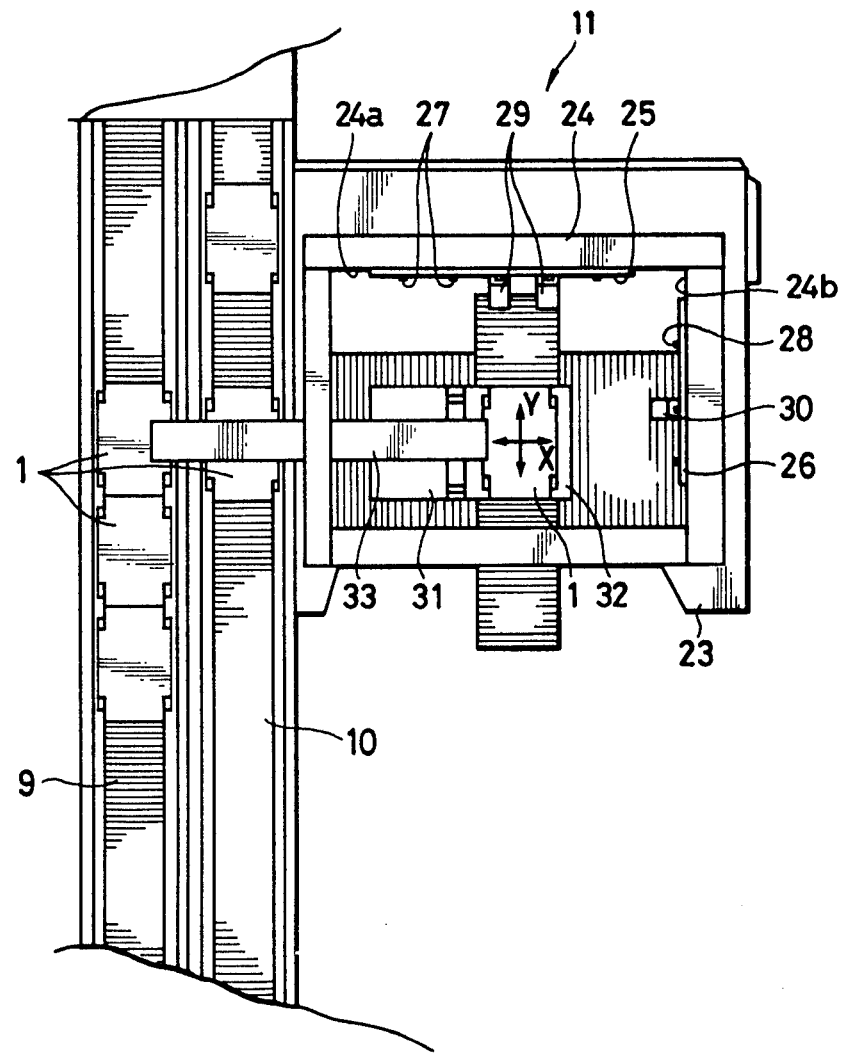
FIG. 4 is a plan view of the assembly center of FIG. 3.

A movable table 31 is mounted on base 23 and is adapted to be driven in the X-axis and Y-axis directions in the horizontal plane of the base 23, as shown in FIG. 4, and a shift table 32 is also horizontally reciprocable within a limited range in the X-axis direction on the movable table 31. It is to be appreciated that the feeding, processing and assembling operations with respect to the carrier 1 and the four chassis 5 thereon occur on the shift table 32. It is to be further appreciated, however, that the shift table 32 is provided to minimize the movements of the table 31 and thereby provide a compact machine, but may be eliminated if desired. In that case, all movements of a carrier 1 would be effected by the movements of table 31.

A loader guide 33 is horizontally suspended from the other leg of mounting member 24 and extends in the X-axis direction, and a carrier loader 34 is slidably mounted to the underside of the loader guide 33 for horizontal reciprocable movement in the X-axis direction between a first position in opposing relation to the upper surface of the movable table 31 of the assembly station 11 and a second position in opposing relation to the upper surfaces of the conveyers 9 and 10. The carrier loader 34 includes first and second chucking stations 35 and 36 (FIG. 5), which will be discussed in greater detail hereinafter, and which are in opposing relation to the conveyers 9 and 10, respectively, when the carrier loader 34 is moved to its second position. The chucking stations 35 and 36 are used for transferring the carriers 1 between the conveyers 9 and 10 and the shift table 32, and accordingly, the chucking stations 35 and 36 include four suspension pawls 37 and 38, respectively, for engaging with the four suspension keepers or handles 4 of each carrier 1 to lift the carriers 1 from the conveyers 9 and 10 or the shift table 32.

Figure 5:
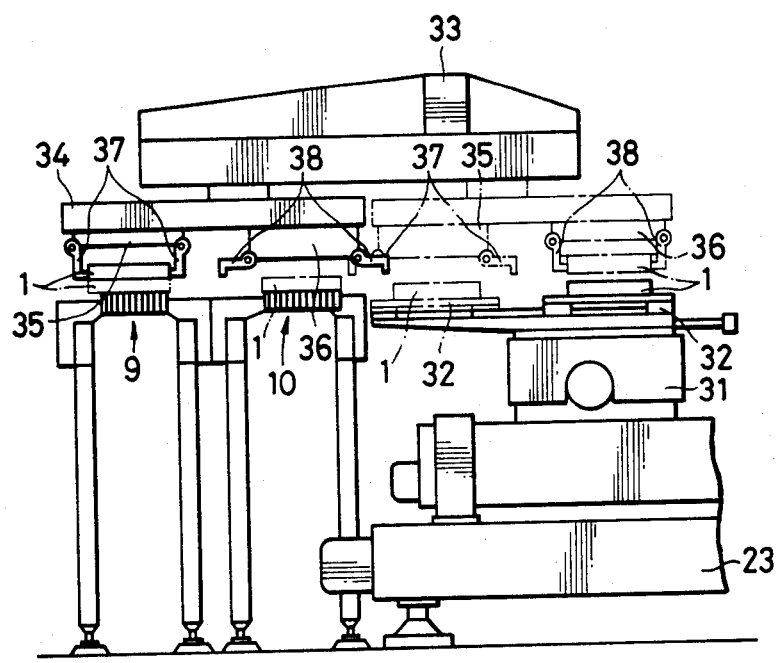
FIG. 5 is an end elevational view of a carrier loader as part of an assembly center of the automatic assembling apparatus of FIG. 2.

The conveyer 9 transfers each carrier 1, prior to the assembly operation, to a position opposite assembly center 11, and at which carrier loader 34 is positioned as indicated by the solid lines in FIG. 5. The suspension pawls 37 of one chucking station 35 of the carrier loader 34 engage the keepers 4 on the carrier 1 to lift the carrier 1 from the conveyer 9. The carrier loader 34 then moves to the position shown in broken lines in FIG. 5 so as to move carrier 1 from a position over the conveyer 9 to a position over the moving table 31 in the assembly center 11. When shift table 32 is moved to the position shown in broken lines, that is, below chucking station 35, carrier 1 is released by the latter and lowered onto shift table 32. The movable table 31 is next moved in the X-axis direction and the Y-axis direction according to a predetermined control program or procedure while working heads of the working units 29 and 30 are vertically moved in synchronism with the movements of movable table 31 to perform the feeding, processing and assembly of the main parts 6 on each chassis 5 and any other associated operations. During these assembling and related operations, the carrier loader 34 is positioned above the conveyers 9 and 10, as indicated by the solid lines of FIG. 5, so as to avoid interference with movements of working units 29 and 30. After the assembly operations have been performed to assemble the parts 6 on each chassis 5, shift table 32 is moved to the position shown in full lines on FIG. 5, and carrier loader 34 is moved to the position shown in broken lines for disposing chucking station 36 above shift table 32 supporting the carrier 1 on which assembly operations have been performed, while a new carrier 1, on which assembly operations are to be performed, is suspended from pawls 37 of chucking station 35. The chucking station 36 then lifts the carrier on which assembly operations have been performed, and the empty shift table 32 is returned to the position shown in broken lines under chucking station 35 to receive from the latter the new carrier 1 on which assembly operations are to be performed.

Upon the return of carrier loader 34 to the position shown in full lines on FIG. 5, chucking station 36 is disposed above conveyer 10 and its pawls 38 are released to lower onto conveyer 10 the carrier 1 on which assembly operations have been performed at assembly center or station 11. At the same time, another carrier 1 on which assembly operations are to be performed is engaged by pawls 37 of chucking station 35 and lifted from conveyer 9 in preparation for the next operating cycle at station 11.

It will be appreciated that the successive carriers 1 on which assembly operations are to be performed are brought to station 11 on conveyer 9, and, after performance of such assembly operations, each carrier 1 is transported away from station 11 on conveyer 10 to the next assembly center or station 12 where a similar cycle of operations is performed. However, at such station 12, the carriers 1 on which assembly operations are to be performed are drawn from conveyer 10 and thereafter returned to conveyer 9 for further transport to the last assembly center or station 13.

Figure 6A:
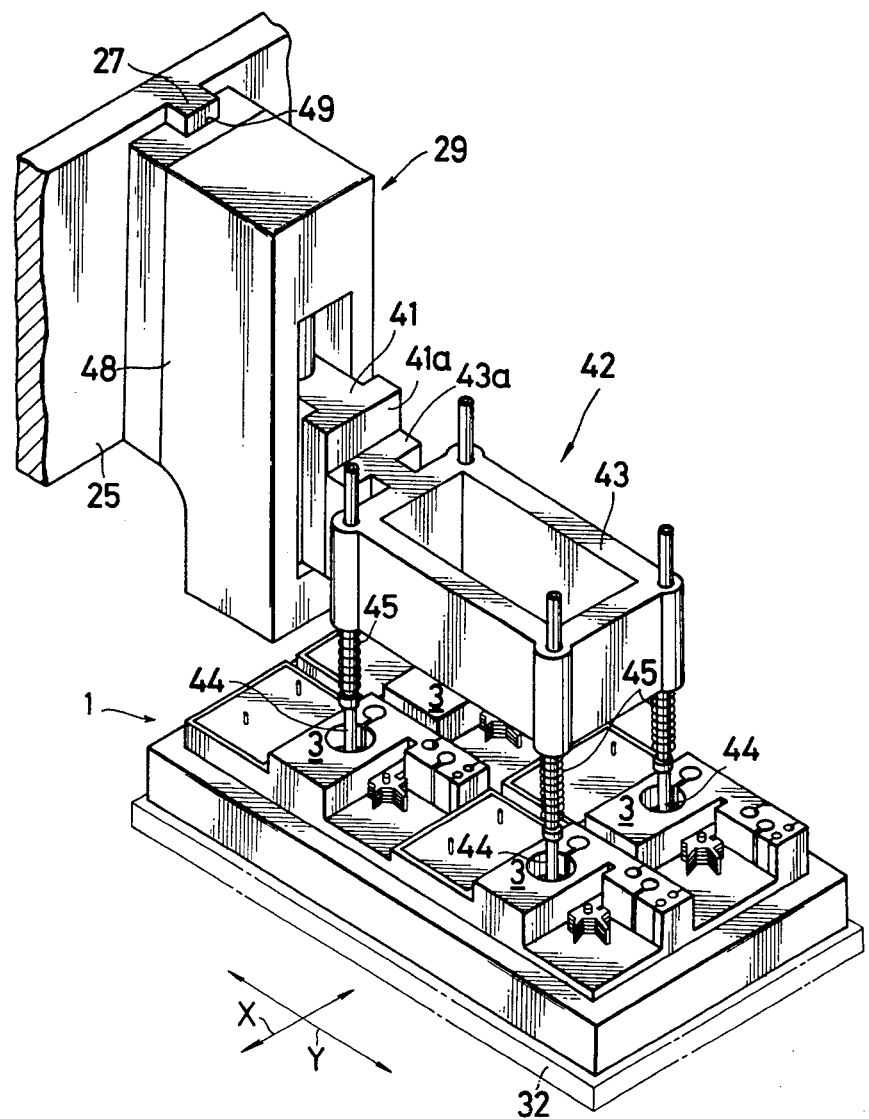
FIGS. 6A and 6B are perspective views illustrating an assembly operation on a carrier member by a working unit.
Figure 6B:
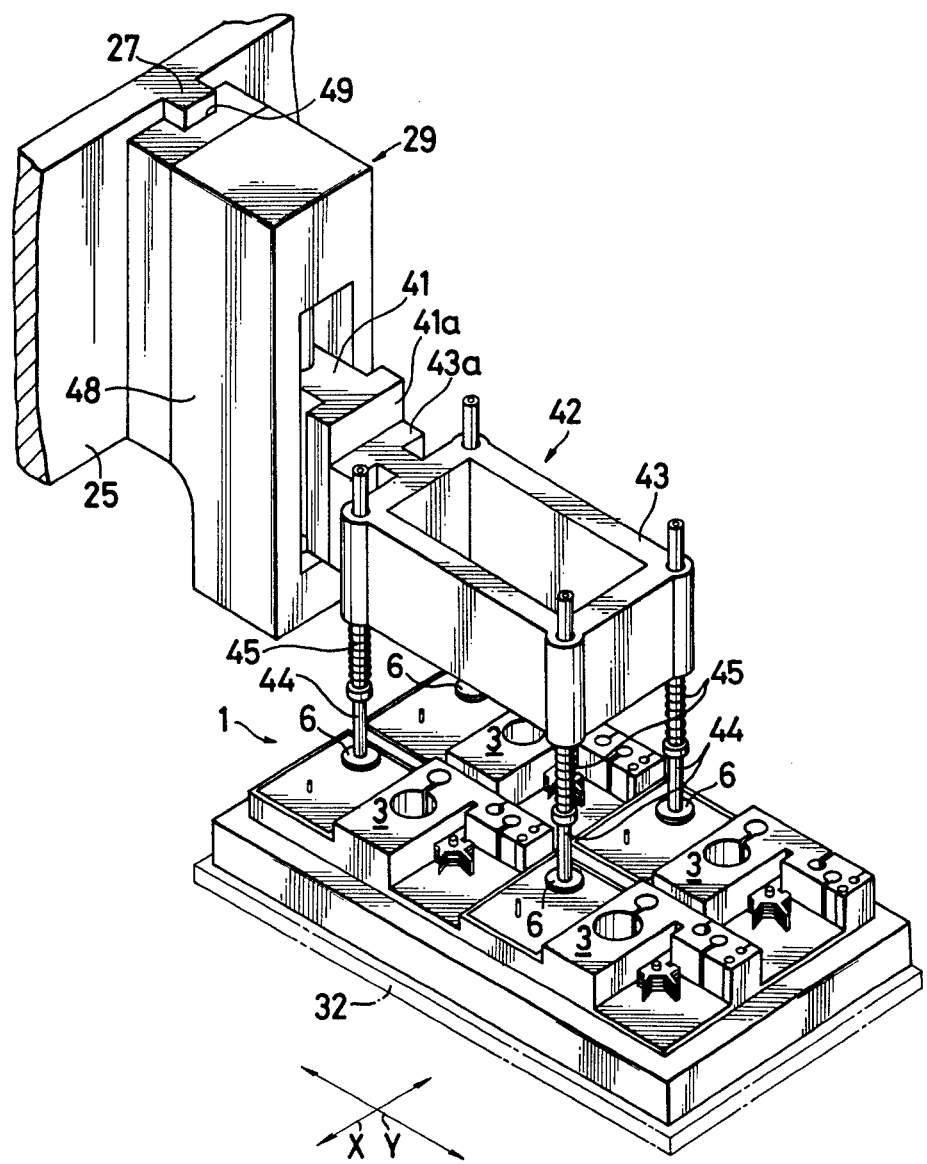

Reference will now be made to FIGS. 6A and 6B in explaining the nature of the work units 29, 30 that are provided at each of the assembly centers or stations 11, 12 and 13 for assembling parts 6 on each related chassis 5 and performing other associated operations. As shown in respect to work unit 29, a lift base 41 is vertically reciprocable relative to a mounting member 41a which is secured on a respective key 27 on plate 25.

A working head 42, which may be of various types, is mounted on a front surface of the lift base 41 so that the working head 42 may be interchanged. In the illustrative embodiment, head 42 includes a head holder 43 which has four chucking heads 44 extending downwardly therefrom. The four chucking heads 44 are positioned with a predetermined distance therebetween corresponding to the distances between corresponding locations on the four pallets 3 of the carrier 1. In an exemplary embodiment, the chucking heads 44 are connected to a vacuum pump (not shown) and can lift the main parts 6 by the suction of air through openings 44b formed in their lower end portions 44a. (FIGS. 7A–7G). The chucking heads 44 are elastically urged downwardly relative to holder 43 by compression springs 45 mounted in surrounding relationship to chucking heads 44.

At each of the assembly centers 11, 12 and 13, when a carrier 1 is placed on the shift table 32 mounted on the respective movable table 31, such carrier 1 is movable in the X-axis and Y-axis directions shown on FIGS. 6A and 6B relative to chucking heads 44, by movement of the movable table 31 in the X-axis and Y-axis directions. Accordingly, the four chassis 5 and the corresponding parts 6 on the four pallets 3 of the carrier 1 are simultaneously positioned with respect to the four chucking heads 44 of the working head 42.

Figure 7A:
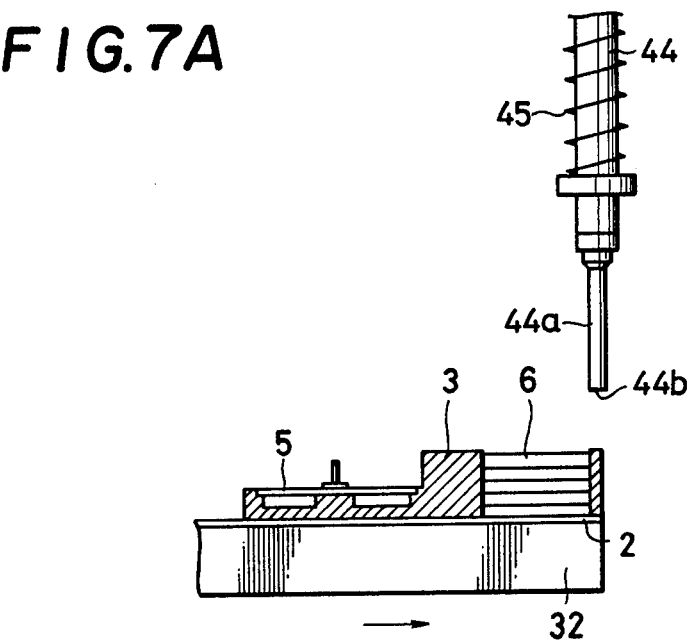
FIGS. 7A to 7G are side views illustrating the operation of the working heads and a movable table during an assembly operation.
Figure 7B:
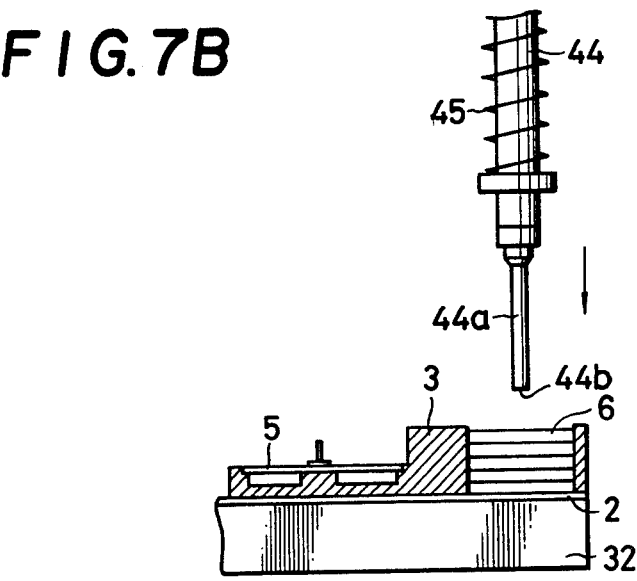
Figure 7C:
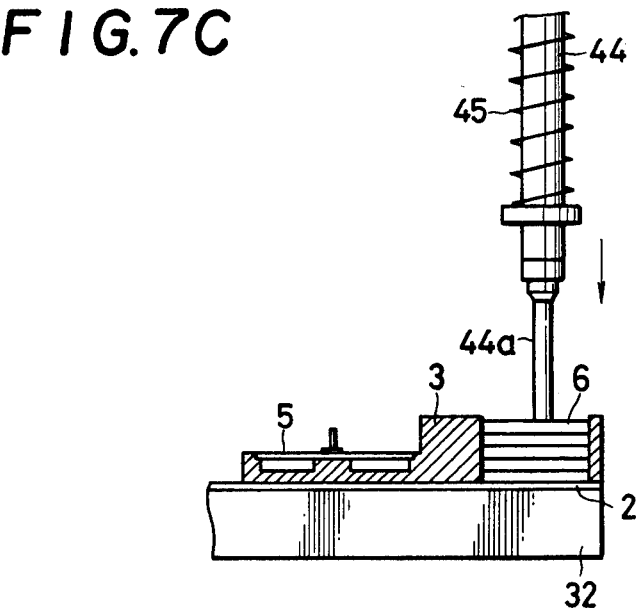
Figure 7D:
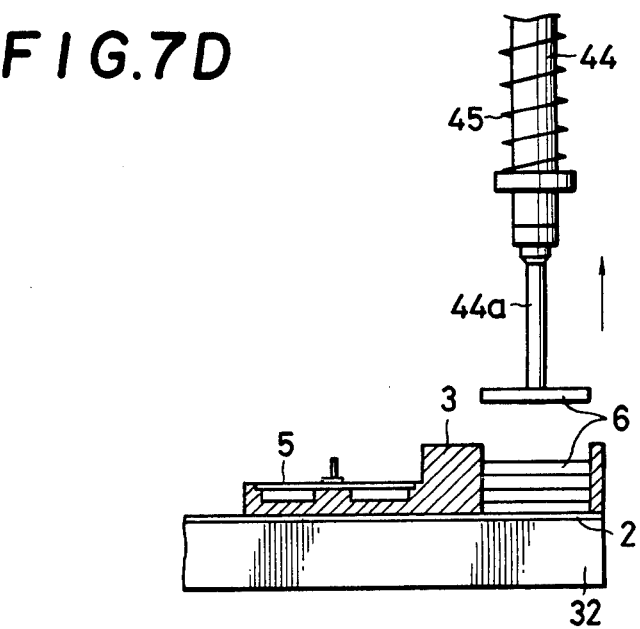

For example, by movement of carrier 1, each chucking head 44 is respectively positioned over a corresponding part 6 on the respective pallet 3 of the carrier 1, as shown on FIG. 7B. As illustrated in FIGS. 6A and 7C, downward movement of lift base 41 of working unit 29 then lowers the working head 42 so that the lower ends 44a of the chucking heads 44 are elastically urged by springs 45 against the respective parts 6. The suction draws the uppermost parts 6 in the stacks thereof to the lower ends 44a. As shown in FIG. 7D, each chucking head 44 of working head 42 subsequently lifts the respective part 6 in response to upward movement of the lift base 41.

Figure 7E:
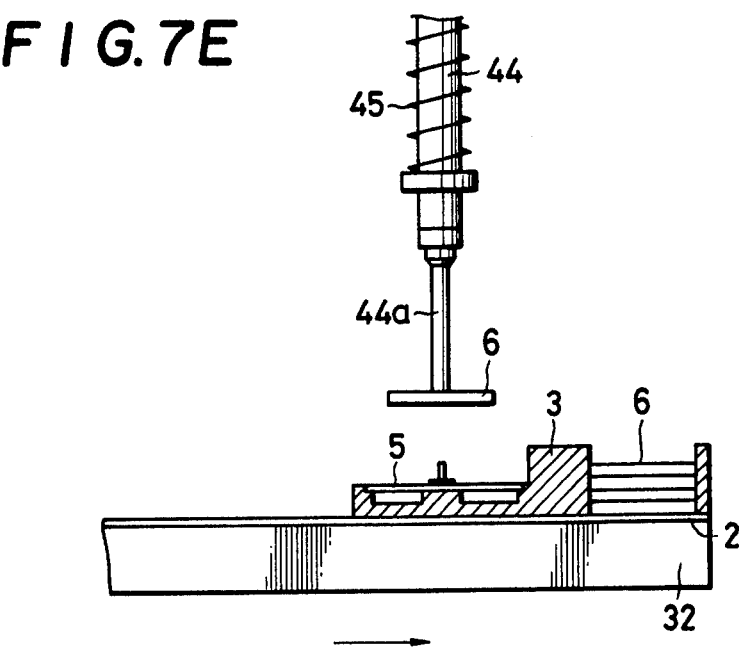

The positions of the chucking heads 44 in the X-axis and Y-axis directions with respect to the chassis 5 placed on the four pallets 3 of the carrier 1 are determined by further suitable movements of the movable table 31. Consequently, the chucking heads 44 are positioned at the assembled positions of the previously lifted parts 6 on the respective chassis 5, as shown in FIG. 7E.

Figure 7F:
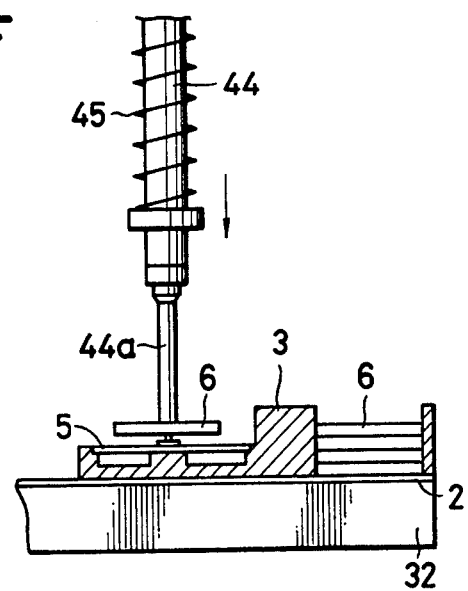
Figure 7G:
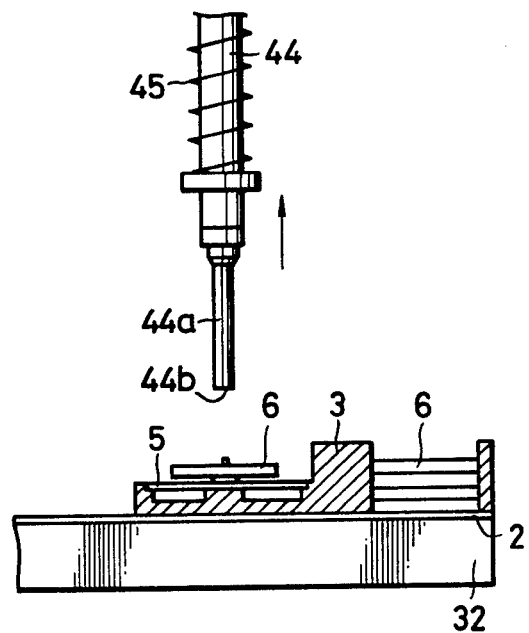

As shown in FIGS. 6B and 7F, the lift base 41 is moved downwardly and lowers the working head 42 whereby the parts 6 adhered by suction to the lower ends 44a of the chucking heads 44 are elastically urged to their assembled positions on the respective chassis 5 to be assembled thereon. Then, the suction applied to the chucking heads 44 is released so that the parts 6 are detached from the lower ends 44a of the chucking heads 44 and remain in this assembled position on chassis 5, as illustrated in FIG. 7G, when the lift base 41 lifts the working head 42 to its initial position where it is ready for the next assembly operation cycle.

A suitably programmed computer or microprocessor can be utilized to conventionally control pneumatically or otherwise powered movements of the movable table 31 in the X-axis and Y-axis directions, vertical movements of working head 42, and the movements of carrier loader 34 during the assembly of the parts 6 on each chassis 5. In such case, changes in the design or type of articles to be assembled are easily accommodated by rewriting and storing a control program in the computer. In the event of such changes, the parts feeding units, the assembly jigs and the like at the assembly stations or centers 11, 12 and 13 need not be modified. An automatic assembling machine is thus made very flexible and can serve for many different assembling operations if the parts to be assembled are carried thereto in accordance with the present invention.

In addition to the working unit 29 described hereinbefore, other working units can be incorporated at the respective assembly centers 11, 12 and 13 for performing, for example, the tightening of screws, the mounting of polygrips and polywashers, the lubrication of parts, the magnetization of magnetic members, and the assembly and processing of other commonly used parts, and the like. These operations can be performed in association with control of the movement of the movable table 31 in the X-axis and Y-axis directions as hereinbefore described.

The number of feeding units and assembly jigs for the parts 6 at the assembly centers 11, 12 and 13 can be significantly reduced since each chassis 5 and at least some of the parts 6 to be assembled thereon are fed onto a carrier 1 and then transferred to the assembly centers 11, 12 and 13 where the predetermined assembly operations are performed.

Since each chassis 5 and the respective parts 6 are positioned on the carrier 1, the movable table 31 at each of the assembly centers 11, 12 and 13 need only control the horizontal movement of the carrier 1 in the X-axis and Y-axis directions. Many kinds of parts 6 can be efficiently mounted on the chassis 5 since only simple vertical movements of the working heads 42 of the working units 29 and 30 are required, and the vertical movements of the working heads 42 can be easily controlled by a suitably programmed computer or microprocessor.

Referring now to FIG. 8A, it will be seen that, in accordance with an embodiment of the invention there illustrated, in addition to a carrier 1 with pallets 3 resting upon shift table 32 on movable table 31, tray tables 48 are attached to shift table 32 along a side thereof. Parts supplying trays 49 are detachably placed in recesses 51 formed in the tray tables 48. Parts 50 of the same kind are arranged in arrays in parts recesses 52 formed in the parts supplying trays 49. In the illustrated embodiment, the tray tables 48 are attached to shift table 32. If shift table 32 is eliminated, as earlier indicated, tray tables 48 are attached directly to the movable table 31.

The parts 50 arranged in the parts recesses 52 of trays 49 are generally hard to stack, and may be, for example, reel shafts or heads used in the assembly of a tape player. The parts manufacturer can arrange the parts 50 on trays 49 prior to shipment, so that the trays 49 with the parts 50 thereon can be placed on the tray table 48 without further preparations.

The parts 50 arranged on the trays 49 are sequentially picked up by the working head 42 of the working unit 29 and are assembled on the chassis 5 in synchronism with movements of the movable table 31. Accordingly, the parts 50 in trays 49 on tray table 48 can be arranged in predetermined positional relationships to cooperate with the positions of the chucking heads 44 attached to each working head 42, just as the main parts 6 are arranged in a predetermined positional relationship on the pallets 3 of the carrier 1.

FIG. 8B illustrates another embodiment of the present invention in which the tray table mounted along a side of shift table 32 so as to be movable with tables 31 is in the form of a tool stand 148. A number of working tools 149, such as processing tools and assembly tools, are detachably mounted on the tool stand 148. The tools 149 are vertically inserted from above into vertical housing holes 150 formed in the upper surface 148a of the tool stand 148. As in the case of the tray table 48 of FIG. 8A, the tool stand 148 can, of course, be attached directly to movable table 31 when there is no shift table 32.

Figure 9:
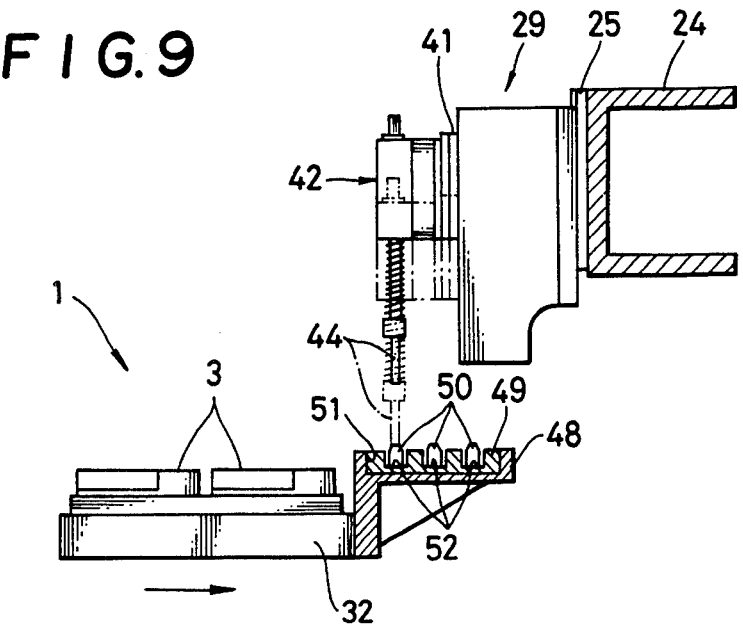
FIGS. 9 and 10 are side views illustrating the assembly of parts on a chassis from a parts tray by a working unit.
Figure 10:
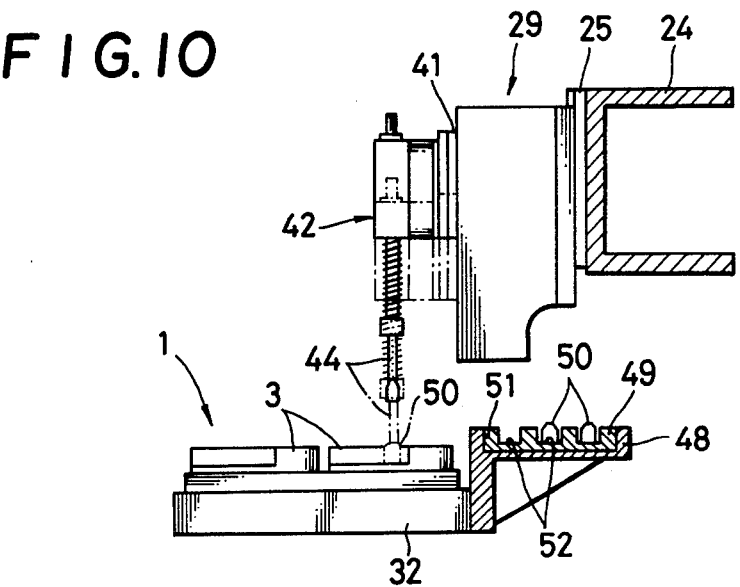
Figure 11A:
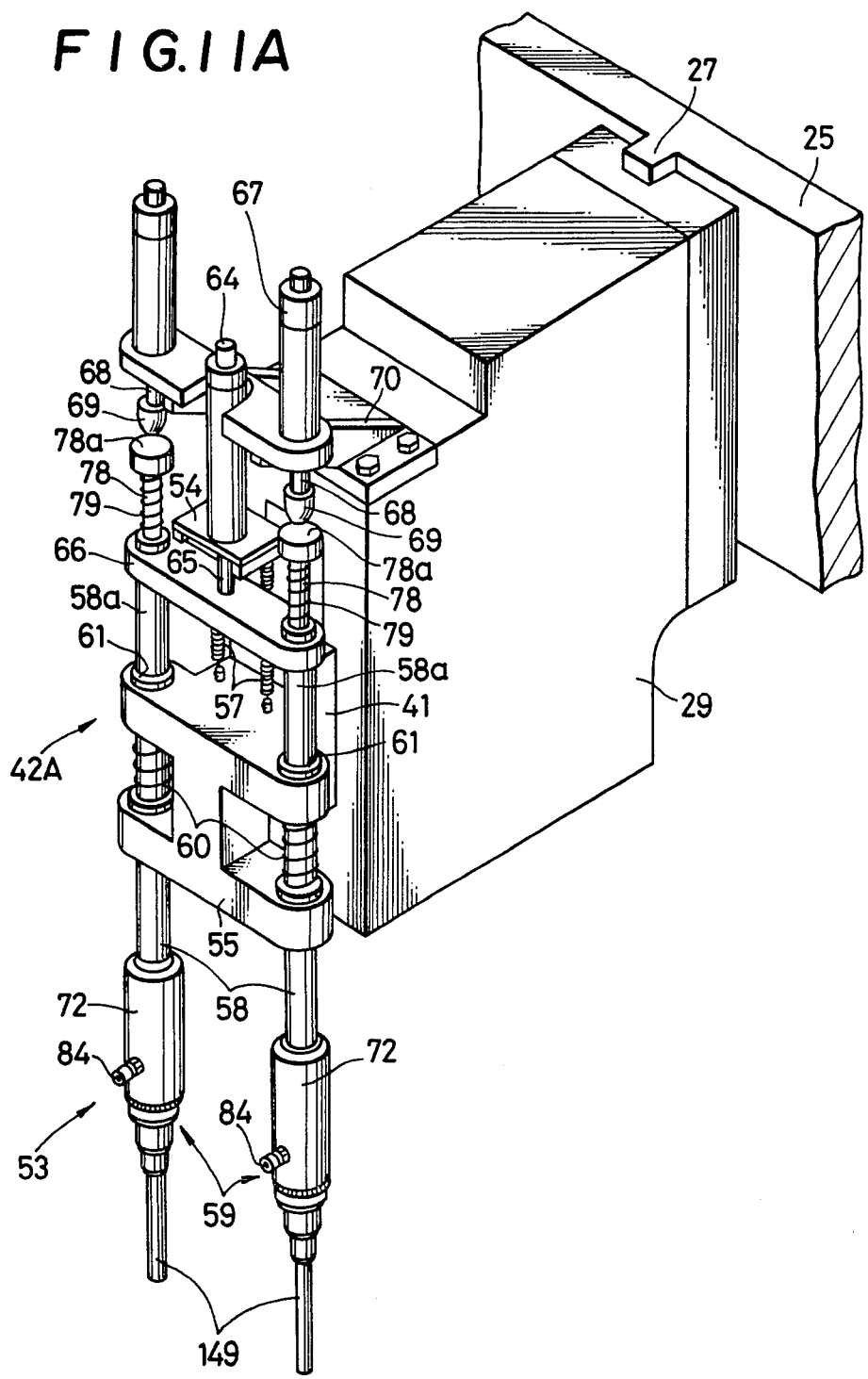
FIG. 11A is a perspective view of an automatic tool exchange head.
Figure 12:
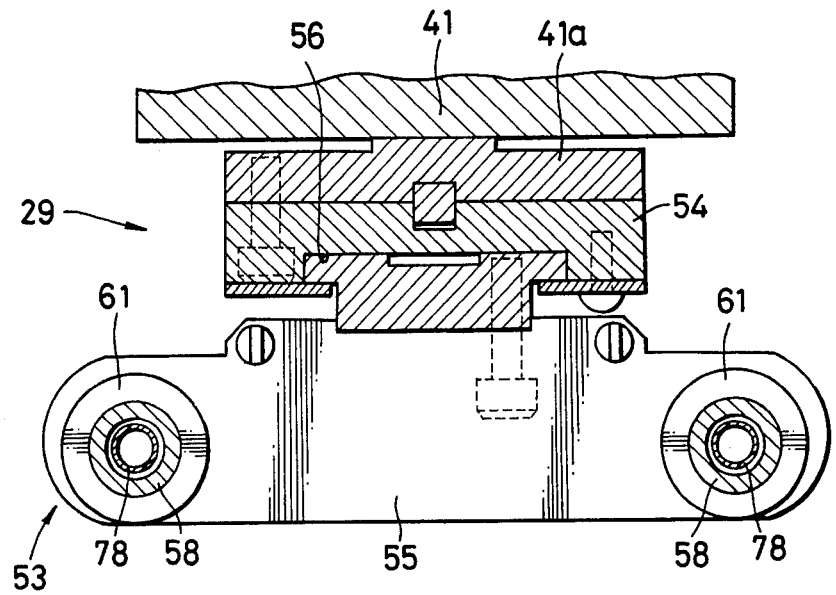
FIG. 12 is a cross sectional view taken along the line XII—XII of FIG. 11B.

FIGS. 9 and 10 show a typical assembly operation of the parts 50 arranged on one of the trays 49 onto the carrier 1. In the illustrative embodiment, the working unit 29 has a working head 42 with a chucking head 44 for each pallet 3 arranged on carrier 1 in the direction of mounting plate 25 on which unit 29 is mounted at the respective one of assembly centers 11, 12 and 13. Initially, the movable table 31 moves to position each tray 49 beneath the respective chucking head 44 of working head 42 with each chucking head 44 being disposed at a predetermined distance above the respective tray 49. The working head 42 is then vertically reciprocated to cause each chucking head 44 to pick up a part 50 arranged on the respective tray 49. The movable table 31 moves the carrier 1 to a predetermined position where the part 50 carried by each chucking head 44 is to be assembled on the chassis 5 carried by the respective pallet 3 of carrier 1. The working head 42 is then reciprocated downwardly to position each part 50 on the respective chassis 5. After each part 50 is positioned on the respective chassis 5, each chucking head 44 is returned upwardly to complete the operation.

FIGS. 11A to 11C, 12 and 13 illustrate a working unit 29 with a working head in the form of an automatic tool exchange head 53 used for changing the tools used in the assembly operations. The automatic tool exchange head 53 is shown to be of the two head type and is detachably mounted by a head holder 54 to a mounting plate 41a formed integrally with the lift base 41 of the working unit 29 mounted at a predetermined position on the mounting plate 25. A vertically movable slide holder 55 is fitted into a vertical guide groove 56 formed in a front surface of the head holder 54. A pair of springs 57 connect the slide holder 55 with an upper end 54a of the head holder 54. A pair of cylindrical shafts 58 extend through the slide holder 55 and are vertically movable with respect to the slide holder 55.

An automatic tool exchange chuck 59 is mounted at the lower end of each cylindrical shaft 58. Compression springs 60 downwardly bias the cylindrical shafts 58. Stopper rings 61 attached to the upper end portions of the cylindrical shafts 58 limit the downward movement of the cylindrical shafts 58 when the stopper rings 61 contact an upper end of the slide holder 55. Pins 62 fixed to the slide holder 55 are positioned in elongate holes 63 formed in the cylindrical shafts 58. The pins 62 limit any rotational movement of the cylindrical shafts 58 by engaging the elongate holes 63. An air cylinder 64 for use in the tool exchange operation is disposed vertically above the upper end of the head holder 54. A lift plate 66 fixed to the lower end of a cylinder rod 65 extends about upper ends 58a of the cylindrical shafts 58. The lift plate 66 can be brought into contact with the stopper rings 61 by action of the air cylinder 64. A pair of air cylinders 67 for use in attaching and detaching the tools 149 are disposed above the upper ends of the cylindrical shafts 58. Press members 69 are mounted on the lower ends of the cylinder rods 68. A cylinder holder 70 mounts the air cylinder 67 to the working unit 29.

Figure 14:
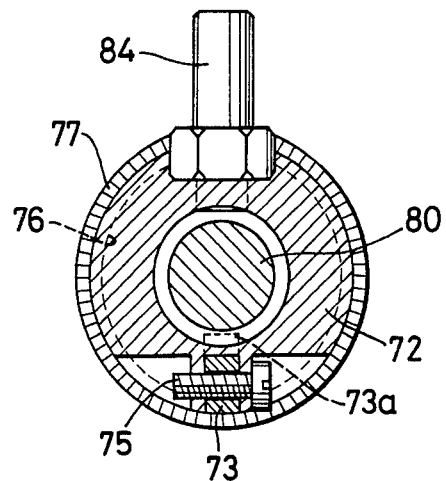
FIG. 14 is an enlarged, sectional view taken along the line XIV—XIV of FIG. 13.
Figure 13:
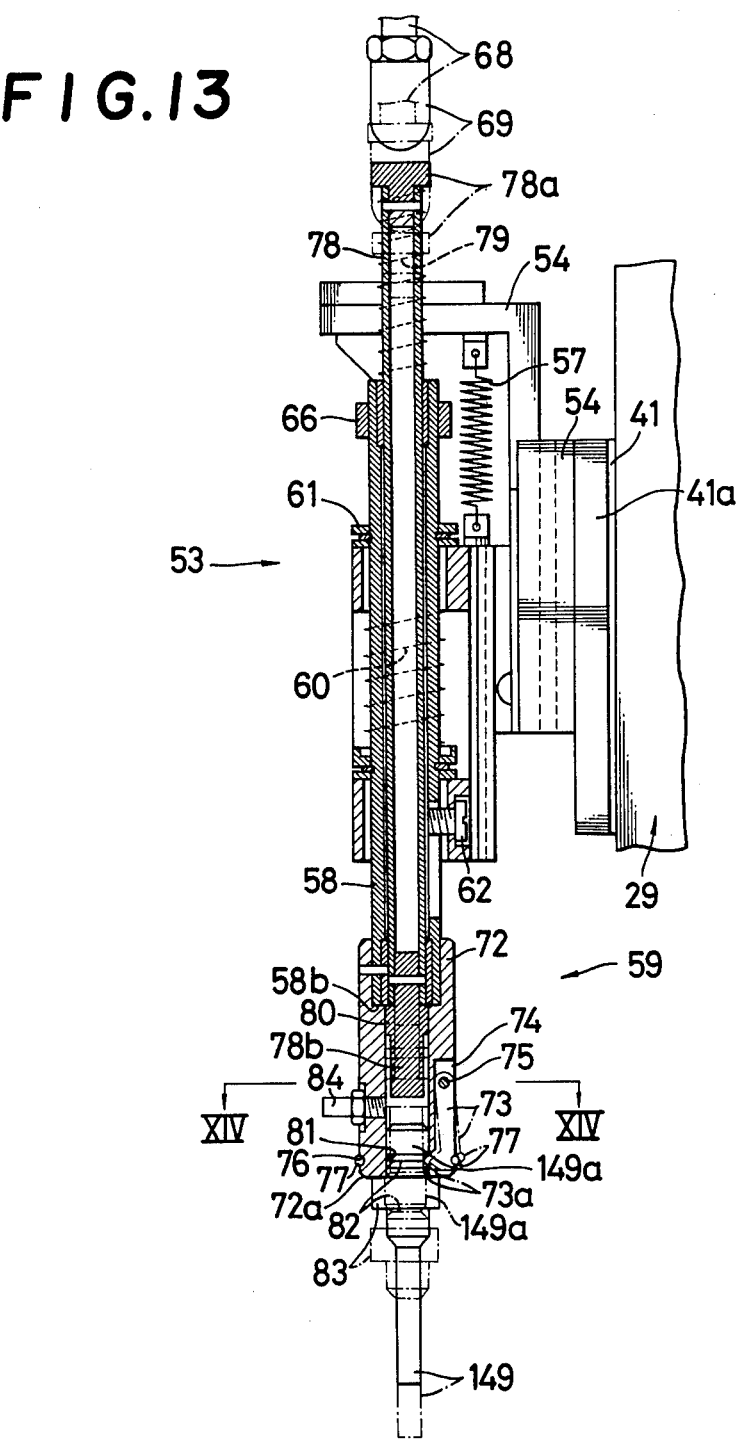
FIG. 13 is an enlarged, longitudinal sectional view of the automatic tool exchange head of FIGS. 11A 11C.

With reference to FIGS. 13 and 14, each automatic tool exchange chuck 59 is shown to have a cylindrically-shaped chuck main body 72 attached to a lower end 58b of the respective cylindrical shaft 58, and a locking pawl 73 mounted at a lower end of the chuck main body 72. The locking pawl 73 is disposed in a slit 74 formed in the chuck main body 72 and pivots about a pin 75. A ring-shaped coil spring 77 fits in an annular groove 76 formed in the outer circumferencial surface of the chuck main body 72 and biases the locking pawl 73 inwardly in a clockwise direction as seen in FIG. 13. A suction fitting 84 is inserted in an intermediate portion of the chuck main body 72 and is in fluid communication with a vacuum pump (not shown). Suction from the vacuum pump is used, in one embodiment, to attach the parts 6 to the tools 149 during assembly. A pair of vertically movable lift rods 78 are disposed within the cylindrical shafts 58. Upper ends 78a of the lift rods 78 extend upwardly from the cylindrical shafts 58 and are proximate the lower ends of the press members 69. The lower end 78b of each lift rod 78 is located near the upper part of the suction fitting 84 of the respective chuck main body 72. Compression springs 79 upwardly bias the lift rods 78. Enlarged diameter portions 80 are formed near the lower ends 78b of the lift rods 78 and abut against the lower ends 58b of the cylindrical shafts 58 to limit downward vertical movement of the cylindrical shafts 58.

With reference to FIGS. 13 and 15A to 15H, the attachment of the working tools 149 with the automatic tool exchange heads 53 is next to be described. The diameter of upper end 149a of the working tool 149 is about the same as the inner diameter of opening 81 formed at lower end 72a of chuck main body 72. Annular groove 82 is formed in the outer circumference of the upper end 149a and engages pawl distal end 73a of the locking pawl 73 to secure the working tool 149 to the chuck main body 72. The upper end 149a of tool 149 has an enlarged diameter portion 83 formed at its lower part to abut against the lower end surface of body 72.

Figure 15A:
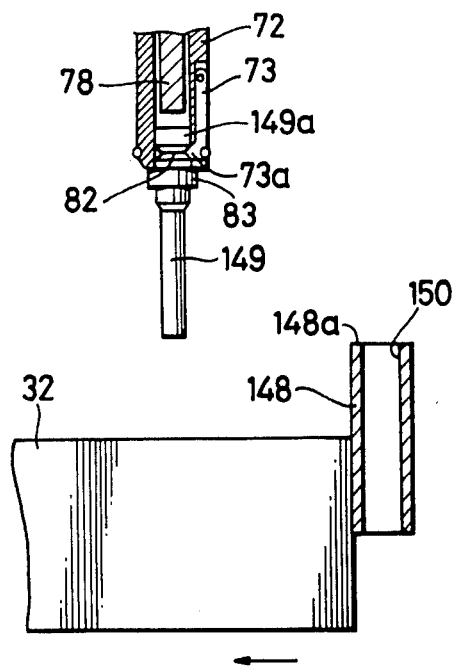
FIGS. 15A to 15H are fragmentary, longitudinal sectional views illustrating the automatic changing of tools in accord with the present invention.
Figure 15B:
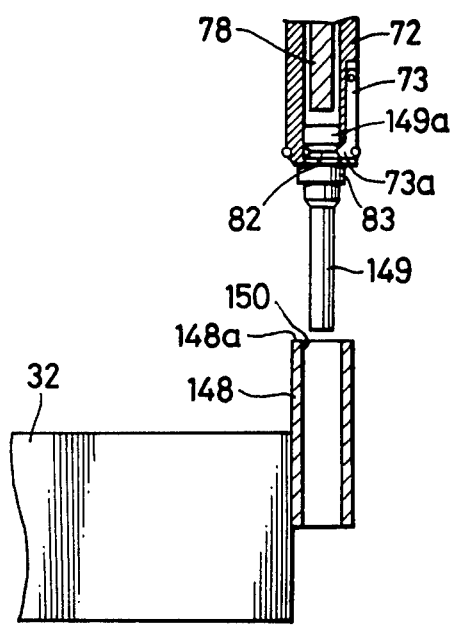
Figure 15C:
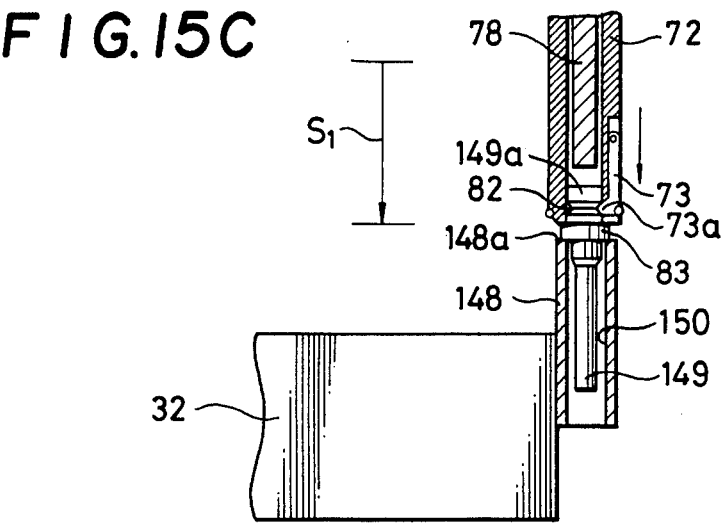

In order to change tools 149, the tool stand 148 is positioned below the chuck main body 72 by suitable movements of the movable table 31 in the X-axis and Y-axis directions, with the tool 149 to be changed being positioned over an empty housing hole 150 in the tool stand 148. The respective chuck main body 72 is lowered by a distance S1, as shown in FIG. 15C. The lower end of the working tool 149 to be exchanged is inserted in the empty housing hole 150 of the tool stand 148, with the enlarged diameter portion 83 of the working tool 149 in contact with upper surface 148a of the tool stand 148.

Figure 15D:
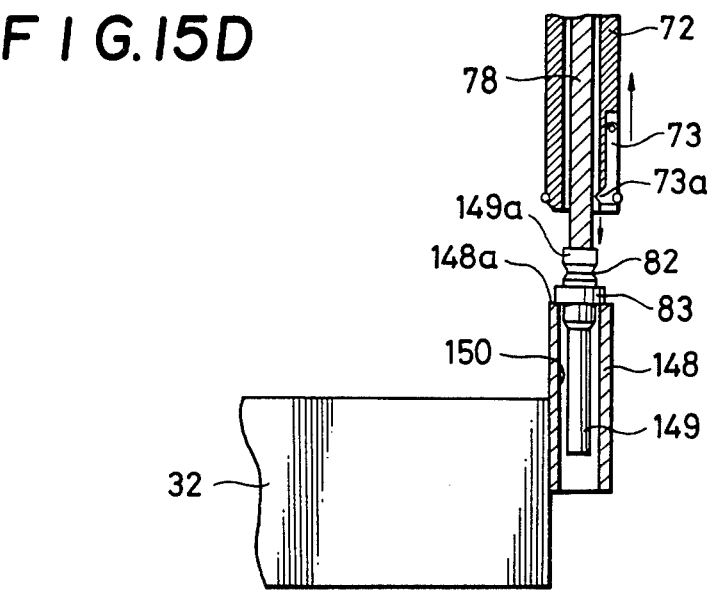

FIGS. 13 and 15D illustrate the detachment of the working tool 149 to be exchanged from the chuck main body 72. The air cylinder 64 is actuated to urge the lift plate 66 against the stopper rings 61 and lower the slide holder 55 to a down position against the biasing force of the suspension springs 57. The air cylinder 67 associated with the tool exchange chuck 59 to be released is operated to force the respective press member 69 to a down position against the upper end 78a of the lift rod 78. The lift rod 78 is driven downwardly against the biasing force of the compression spring 79, with the lower end 78b urging downwardly the upper end 149a of the tool 149 to be exchanged. With the lift rod 78 holding the tool 149 in the hole 150a of tool stand 148, the air cylinder 64 is deactuated to release the lift plate 66. The suspension springs 57 restore the slide holder 55 to the up position. During the resultant upward movement of the chuck main body 72, the locking pawl 73 is displaced out of groove 82 and pivots in a counterclockwise direction as seen in FIG. 13. Thus, distal end 73a of pawl 73 no longer engages the annular groove 82 in the working tool 149 and the latter is automatically released from the tool exchange chuck 59. The air cylinder 67 of the released chuck 59 is then actuated to restore the cylinder rod 68 and press member 69 to the up position, wherein the compression spring 79 restores the lift rod 78 to the up position.

Figure 15E:
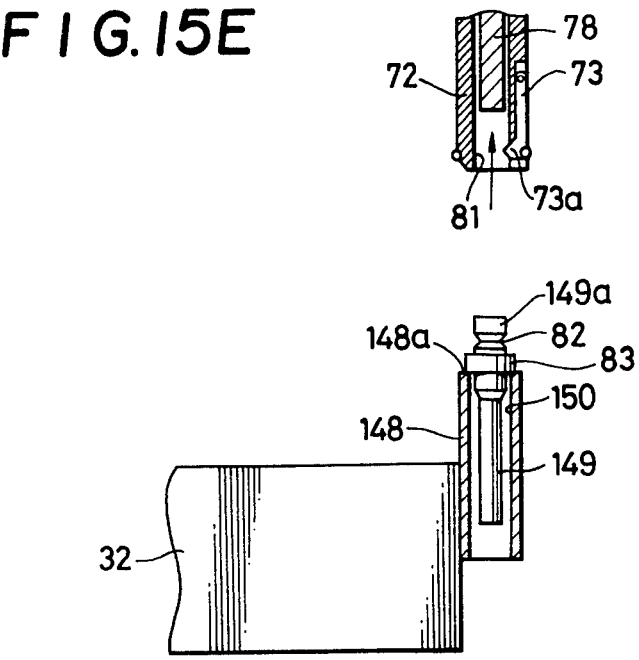
Figure 15F:
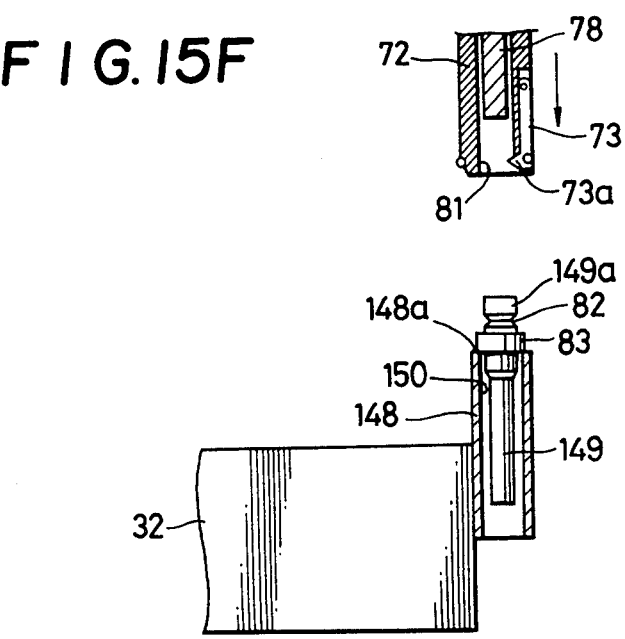
Figure 15G:
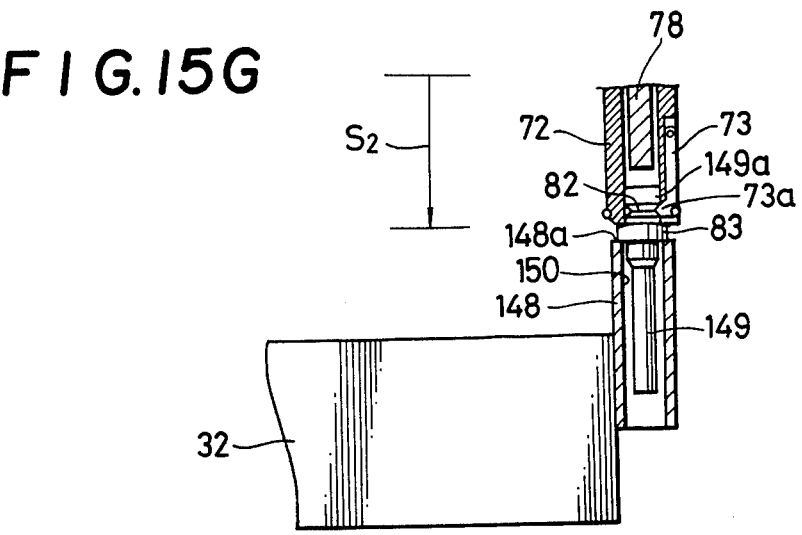
Figure 15H:
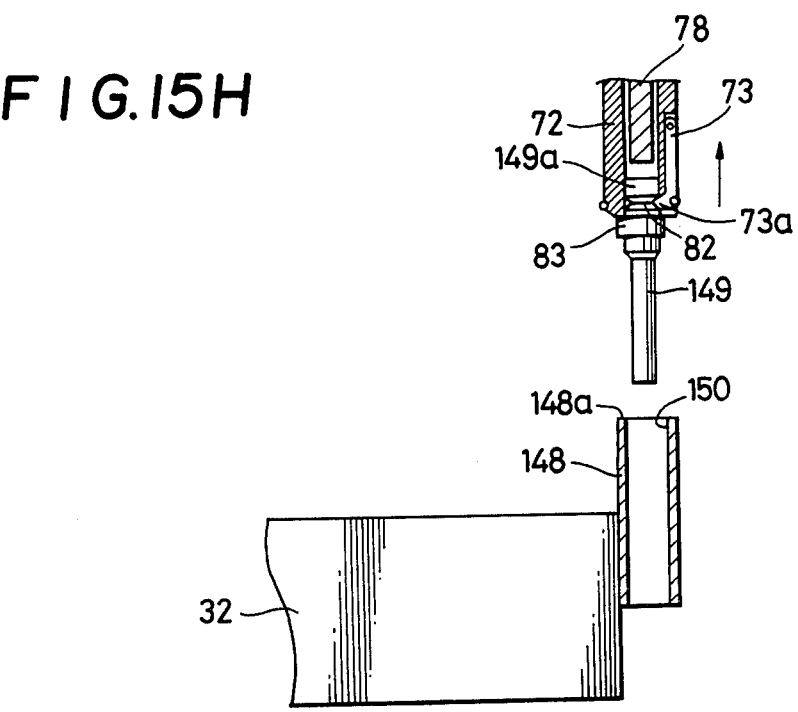

With reference to FIG. 15E, the working unit 29 now reciprocates the empty chuck main body 72 upwardly. The chuck main body 72 is positioned over another or new working tool 149 on the tool stand 148 by movements of the movable table 31, as shown on FIG. 15F. As illustrated in FIG. 15G, the chuck main body 72 is lowered by a distance S2 to attach another working tool 149 thereto. The air cylinder 64 is actuated to urge the lift plate 66, the slide holder 55, and the cylindrical shafts 58 downwardly against the biasing force of the suspension springs 57. The upper end 149a of the new working tool 149 is inserted in the opening 81 of the lower end 72a of the chuck main body 72. The distal end 73a of locking pawl 73 engages the annular groove 82 in the new working tool 149. The air cylinder 64 is deactuated so that the suspension springs 57 restore the slide holder 55 and cylindrical shafts 58 to the up position. The new working tool 149 is removed from the respective housing hole 150 in the tool stand 148 by vertical reciprocal motion of the working unit 29, as seen in FIG. 15H.

Accordingly, the automatic exchange of the working tools 149 is effected, and various processing and assembly operations can be performed by the working tools 149 successively attached to each chuck main body 72. During the processing and assembly operations, the automatic tool exchange head 53 is moved by the vertical movement of the lift base 41 attached to the working unit 29. Each time the working tools 149 are urged against the respective parts 6, the cylindrical shafts 58 slide upwardly relative to the slide holder 55 against the biasing force of the compression springs 60. The compression springs 60 keep the tools 149 in contact with the parts 6 and provide play to accommodate the vertical movements of the lift base 41.

As will be evident to those with skill in the art, the working tools 149 can be automatically changed by suitable movements of the movable table 31. If movements of the movable table 31 are controlled by a programmed computer or microcomputer, the same program used for the assembly of the parts 6 can also be used to control the changes of the working tools 149 used during the assembly. The vertical distances S1 and S2 used in changing the tools 149 can be the same, and can be programmed in the computer control program.

A significant advantage of the present invention resides in the simple structure of the automatic tool exchange head. Since the tool stand 148 is positioned near the carrier 1 (either on the shift table 32 or on the movable table 31) and since the tool stand 148 moves along with the carrier 1, distances between the tool stand 148 and the carrier 1 can be significantly reduced. The changing of the working tools 149 can be performed quickly and in synchronism with the assembly of the parts 6 on the carrier 1.

Still another advantage of the present invention resides in the supplying of parts 50 which are hard to stack. The parts 50 can be arranged on the trays 49, so that the working head 42 can sequentially pick up and assemble the parts 50 on the chassis 5. When changes in the equipment require different parts 50, only the tray 49 needs to be changed; the parts supplying units and associated units do not need to be significantly modified. Therefore, an automatic assembling machine in accord with the present invention is very flexible in its construction.

Having described specific preferred embodiments of the present invention, it is to be understood that the present invention is not limited to those embodiments, and that various further changes and modifications may be made therein by one skilled in the art without departing from the spirit or scope of the invention as defined in the appended claims.

We claim:

1. A machine for automatically assembling equipment composed of parts at least some of which are arranged on a carrier comprising:
    movable table means for supporting said carrier and moving in two orthogonal directions in a horizontal plane;
    tray means supported on said table means for movement with the latter and adapted to carry elements for use during said assembling;
    mounting surface means extending above said plane of said movable table means and having first and second mounting surface portions parallel to said two orthogonal directions, respectively; and
    at least one working unit means releasably attached to at least one of said first and second mounting surface portions of said mounting surface means at a selected one of a plurality of locations on said first and second mounting surface portions for selective engagement with said parts on the carrier and said elements on said tray means upon respective movements of said table means in assembling said equipment.

2. The machine of claim 1; wherein said elements carried on said tray means are additional parts for use in assembling said equipment.

3. The machine of claim 2; in which there are at least two sets of said parts on said carrier and said tray means which, in each of said sets, are in a predetermined positional relationship to each other, with corresponding parts in said sets, respectively, being at uniform distances from each other in one of said two orthogonal directions, and in which said working unit means includes at least two chucking heads extending therefrom and being at said uniform distances from each other in said one of said orthogonal directions so as to be simultaneously engageable with corresponding parts of said respective sets in response to movements of said table means.

4. The machine of claim 3; and further comprising shift table means positioned on said movable table means and supporting said carrier and said tray means for lateral movement thereof relative to said movable table means in one of said orthogonal directions.

5. The machine of claim 4 in which said shift table means has a side; and in which said tray means is attached to said side of said shift table means.

6. The machine of claim 3; in which said working unit means is vertically movable in synchronism with said respective movements of said table means.

7. The machine of claim 1; wherein said elements carried on said tray means are tools for selective attachment to said working unit means.

8. The machine of claim 7; and further comprising shift table means disposed on said movable table means and supporting said carrier and said tray means for lateral movement thereof relative to said movable table means in one of said orthogonal directions.

9. The machine of claim 8; in which said shift table means has a side; and in which said tray means is secured to said side of said shift table means.

10. The machine of claim 7; in which there are at least two sets of said parts and said tools arranged in a predetermined positional relationship to each other, with corresponding parts and tools in said sets, respectively, being at uniform distances from each other in one of said two orthogonal directions; and in which said working unit means includes at least two heads for chucking at least two of said tools to said working unit means and being at said uniform distances from each other in said one of said orthogonal directions so as to be simultaneously engageable with corresponding parts of said respective sets in response to said movements of said table means, said tools in said sets being changeable in response to said respective movements of said table means.

11. The machine of claim 10; in which said working unit means is vertically movable in synchronism with said respective movements of said table means.

* * * * *